3,178,256
METHOD FOR SEPARATING TRANSPLUTONIUM ELEMENTS FROM RARE EARTH FISSION PRODUCTS
Fletcher L. Moore, Knoxville, Tenn., assignor to the United States of America as represented by the United States Atomic Energy Commission
No Drawing. Filed Nov. 25, 1960, Ser. No. 71,846
8 Claims. (Cl. 23—14.5)

My invention relates to methods for the separation of transplutonium elements from rare earth elements.

Transplutonium elements, because of their high activity and reasonably long half life, have become useful as radiation sources. For details concerning the preparation of radiation sources from transplutonium elements, reference is made to U.S. Patent 2,809,887, issued October 15, 1957, to Oliver J. C. Runnalls for "Method of Alloying Reactive Metals With Aluminum or Beryllium."

Radiation-source applications require high purity elements uncontaminated by other radioactive elements. However, the transplutonium elements, upon formation, are associated with fission products including rare earth fission products. Separation of the rare earth elements from the transplutonium elements presents difficulties because of similar chemical properties of elements of the two groups. The fact that in an aqueous solution the transplutonium elements are present in the trivalent state, and, with the exception of berkelium, cannot easily be oxidized, makes impracticable separation processes based on changes of valence. Ion exchange methods have been employed in the prior art to separate these groups. In these methods an aqueous solution containing transplutonium values and rare earth values is contacted with a cation exchange resin whereby the metal values are sorbed on the resin and the sorbed ions are then selectively eluted from the resin. This method has the disadvantages that it is not continuous; separation of transplutonium values from rare earth values requires the use of a strong acid; and, the separation factors are relatively low.

One object of my invention is to provide an improved method for separating transplutonium and rare earth values.

Another object is to provide a method for separating transplutonium and rare earth values which does not require the use of highly corrosive acid as a reagent.

Another object is to provide such a method which may be carried out in a continuous manner.

Still another object is to provide such a method wherein the separation factor is high.

In accordance with my invention I have provided a process for recovering transplutonium values from an acidic aqueous solution containing said values together with rare earth values comprising providing a high concentration of lithium chloride in said aqueous solution, contacting the resulting aqueous solution with a substantially water-immiscible organic solution comprised of an organic diluent and a tertiary amine represented by the formula

where $R_1$, $R_2$ and $R_3$ are selected from the group consisting of alkyl, alkylene, aryl, and aryl-substituted alkyl and alkylene radicals, thereby transferring transplutonium values into the organic solution, separating the resulting organic solution from the resulting aqueous solution and recovering transplutonium values from said separated organic solution.

My invention provides a rapid method of separating transplutonium values from rare earth values in a low acid system. Further advantages are high separation factors and the adaptability of my method to remote control and continuous processing with elimination of the mechanical disadvantages of a resin system, notably (1) plugging of columns due to excessive gas formation; and (2) tendency of resins to float in concentrated salt solutions.

In carrying out my invention an aqueous solution containing transplutonium and rare earth values is provided with a high concentration of lithium chloride. The lithium ion in the aqueous solution becomes highly hydrated, thus reducing the concentration of free water, thereby promoting the formation of the anionic chloro complex of the transplutonium elements. The chlorides of the other alkali metals and alkaline earth metals are not effective in my separation process. Lithium chloride must be present in a concentration of at least 9 molar in order to give a suitable separation factor, and the preferred concentration range is from 10 to 12 molar. As the concentration exceeds approximately 12 molar, the separation factor is not substantially changed.

The pH of the aqueous solution must be below approximately 5. I have discovered that the presence of a small amount of hydrochloric acid improves the separation factor, and in the preferred method of carrying out my invention the aqueous solution is provided with hydrochloric acid in a concentration of from 0.001 to 0.2 molar.

My process may be employed to separate any one or all of the transplutonium elements from any one or all of the rare earth values. It is particularly useful in separating americium from promethium because of the difficulties encountered in separating these two elements by other methods.

The aqueous phase, containing transplutonium and rare earth values and provided with lithium chloride in a high concentration is contacted with a tertiary amine.

While undiluted liquid tertiary amines will preferentially extract transplutonium values, the organic phase is viscous and difficult to handle and in the preferred method of carrying out my invention the amine is dissolved in an organic solvent. A wide variety of solvents may be employed including the aliphatic hydrocarbons, as exemplified by kerosene, and the aromatic solvents as exemplified by benzene, toluene, and xylene. The aliphatic hydrocarbons must be provided with an additive to prevent formation of a third phase. The long chain alcohols such as butyl Cellosolve are suitable additives for this purpose. The concentration of the amine in the organic solvent is not critical and may be varied from 5 to 40 percent, a concentration within the range of 10 to 20 percent being preferred.

The organic solvent should be saturated with HCl prior to extraction in order to avoid hydrolytic difficulties in the aqueous phase. Alternatively, one may use untreated solvent, provided a slight excess of aqueous HCl (over amine concentration) is present initially. Tertiary amines having a molecular weight within the range of 200 to 600 may be used in my process. The tertiary amines having from 24 to 36 carbon atoms are preferred. Typical useful amines are tri-n-octylamine, triisooctylamine, trilaurylamine, methyl-di-octylamine, N-methyldi-n-octylamine, N-lauryldi-n-butylamine and N-benzyldilaurylamine.

The temperature at which the extraction is carried out is not critical, at least from 0° C. to 55° C., and a temperature from 20 to 30° C. is preferred.

The organic phase, now containing extracted transplutonium values, is separated from the aqueous phase which contains the bulk of the rare earth values. The transplutonium values may be removed from the organic phase by contacting the organic phase with a wide variety of stripping solutions. Typically useful stripping solutions are water, dilute hydrochloric acid, dilute nitric acid, and dilute sulfuric acid. The transplutonium elements may also be stripped into a concentrated solution of lithium chloride which contains a low concentration of nitric acid. The following table illustrates the effectiveness of removing transplutonium values from the organic phase by stripping.

STRIPPING AMERICIUM-241 FROM 20% TRIISO-OCTYLAMINE-XYLENE SOLUTION

[Phase ratio 1:1; americium concentration $3.8 \times 10^4$ gamma counts per minute per milliliter]

| Stripping agent: | Americium stripped, percent |
|---|---|
| Distilled water | 99.2 |
| 0.1 molar HCl | 99.0 |
| 1 molar HCl | 99.9 |
| 1 molar HNO$_3$ | 99.9 |
| 1 normal H$_2$SO$_4$ | 99.3 |
| 11.9 molar LiCl—1.6 molar HNO$_3$ | 99.5 |

It is obvious that any conventional liquid-liquid contacting equipment such as packed columns, pulse columns, and mixer-settlers may be used in carrying out my invention.

The following examples are offered to illustrate my invention in more detail.

*Example I*

Ten milliliters of an aqueous solution containing americium-241 ($3.1 \times 10^5$ gamma counts per minute) and promethium-148 ($3.6 \times 10^5$ gamma counts per minute) and 0.002 molar in hydrochloric acid was contacted for two minutes at room temperature with ten milliliters of 20 percent triisooctylamine in xylene, previously saturated with hydrochloric acid. The two phases were separated and the aqueous phase was contacted with two additional ten milliliter portions of the triisooctylamine extractant.

Analysis of the phases indicated negligible extraction of americium and promethium.

As can be seen from Example I, a tertiary amine extracts neither americium nor promethium from an aqueous solution containing a low concentration of metal salts.

*Example II*

Ten milliliters of an aqueous solution containing americium-241 ($3.1 \times 10^5$ gamma counts per minute) and promethium-148 ($3.6 \times 10^5$ gamma counts per minute), 10.5 molar in lithium chloride, and 0.002 molar in hydrochloric acid was contacted for two minutes at room temperature with ten milliliters of 20 percent triisooctylamine in xylene, saturated with hydrochloric acid. The two phases were separated and the aqueous phase was contacted with two additional ten milliliter portions of the triisooctylamine extractant. Analysis of the phases indicated an extraction of over 98 percent of the americium and approximately 6 percent of the promethium.

As can be seen from Example II, the extraction power of a tertiary amine for americium is high, but is low for promethium when the americium and promethium-containing aqueous phase is provided with a high concentration of lithium chloride.

*Example III*

Twelve milliliters of an aqueous solution containing americium-241 ($3.9 \times 10^5$ alpha counts per minute), curium-244 ($1.6 \times 10^4$ alpha counts per minute) and rare earth elements ($2.7 \times 10^5$ gamma counts per minute of approximately equal amounts of cerium-144, promethium-148, europium-152, yttrium-91 and thulium-170) was adjusted to a concentration of 11.7 molar lithium chloride and 0.1 molar hydrochloric acid. The resulting aqueous solution was contacted for two minutes with 12 milliliters of a 20 percent triisooctylamine-xylene mixture saturated with hydrochloric acid. The two phases were separated and the separated aqueous phase was contacted with another 12 milliliters of the triisooctylamine-xylene mixture. The two portions of organic phase were combined and contacted with two 12 milliliter portions of a 12 molar lithium chloride solution. Analysis of the organic phase showed that the average of the amount of americium and curium extracted was 96.5 percent and 3.1 percent of the rare earth tracers was extracted.

As can be seen from Example III, an excellent separation of transplutonium elements from a mixture of rare earths can be achieved by my method.

The above examples are intended to be only illustrative, and my invention should be limited only as is indicated by the appended claims.

What is claimed is:

1. A process for recovering transplutonium values selected from the group consisting of trivalent americium and curium from an aqueous solution containing said values together with rare earth fission product values comprising providing lithium chloride in said aqueous solution in a concentration of at least 9 molar and adjusting the pH of said solution to a value less than 5, contacting the resulting aqueous solution with an organic solution comprising a tertiary amine represented by the formula

where $R_1$, $R_2$ and $R_3$ are selected from the group consisting of alkyl, alkylene, aryl, and aryl-substituted alkyl and alkylene radicals, thereby transferring transplutonium values into said organic solution, separating the resulting organic solution from the resulting aqueous solution and recovering said transplutonium values from said separated organic solution.

2. The process of claim 1 wherein the aqueous solution containing transplutonium and rare earth values is from 0.001 to 0.2 molar in hydrochloric acid.

3. The process of claim 1 wherein the transplutonium values comprise americium values.

4. The process of claim 1 wherein the transplutonium values comprise curium values.

5. The process of claim 3 wherein the rare earth values comprise promethium values.

6. The process of claim 1 wherein the organic solution comprises an organic diluent and an amine represented by the formula

where $R_1$, $R_2$ and $R_3$ are selected from the group consisting of alkyl, alkylene, aryl, and aryl-substituted alkyl and alkylene radicals having from 8 to 12 carbon atoms.

7. The process of claim 6 wherein the concentration of amine in the organic solution is from 5 to 40 percent by weight.

8. The process of claim 1 wherein the transplutonium values comprise americium values and the rare earth values comprise promethium values.

References Cited by the Examiner

UNITED STATES PATENTS

| 2,840,451 | 6/58 | Katzin | 23—14.5 |
| 2,877,250 | 3/59 | Brown et al. | 23—14.5 |
| 2,990,244 | 6/61 | Brown et al. | 23—14.5 |
| 3,047,360 | 7/62 | Sheppard | 23—14.5 |

OTHER REFERENCES

Process Chemistry, Progress in Nuclear Eenergy, Series III, volume II, Pergamon Press, 1958, page 6.

CARL D. QUARFORTH, *Primary Examiner.*

LEON D. ROSDOL, *Examiner.*